UNITED STATES PATENT OFFICE.

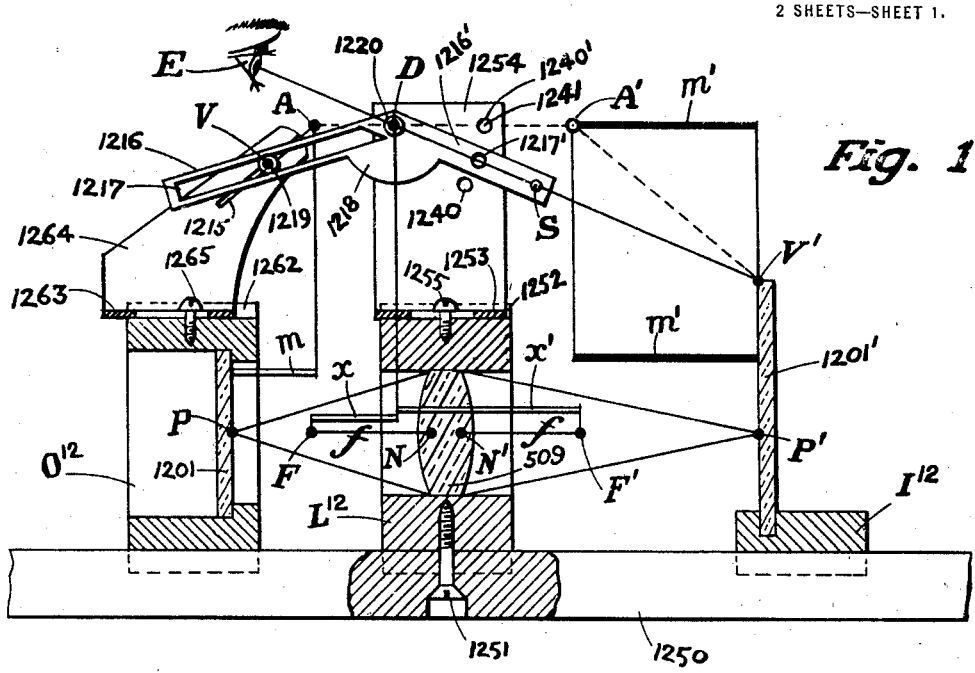
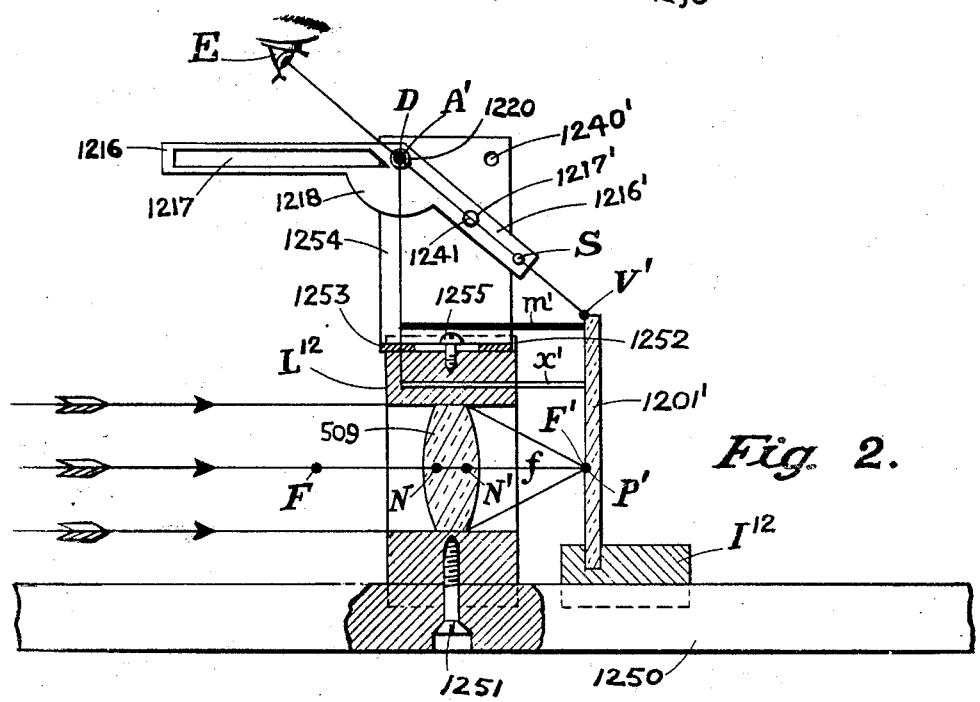

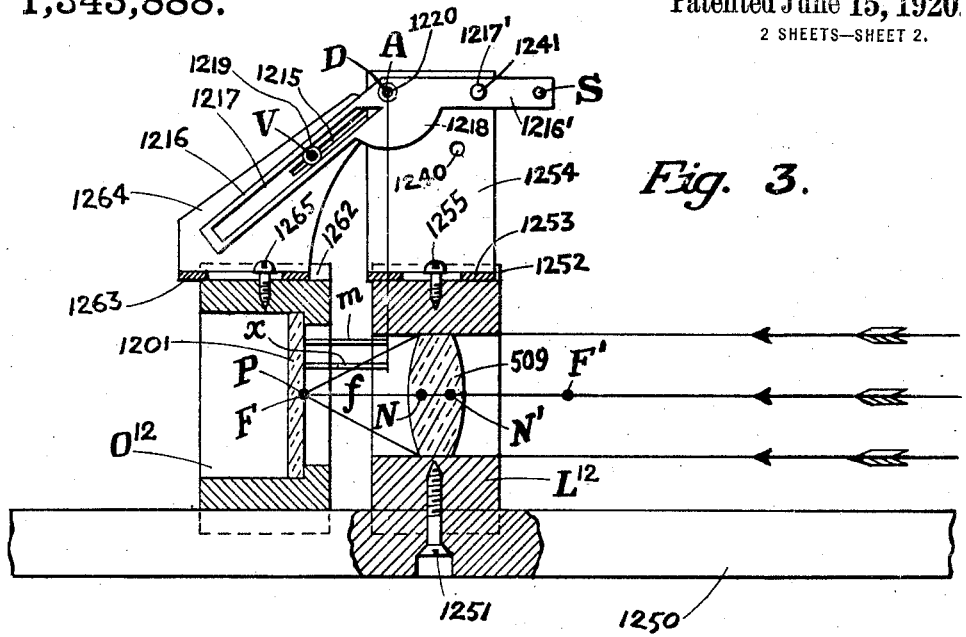

JOSEPH BECKER, OF WASHINGTON, DISTRICT OF COLUMBIA, ASSIGNOR TO EASTMAN KODAK COMPANY, OF ROCHESTER, NEW YORK, A CORPORATION OF NEW YORK.

PHOTOGRAPHIC CAMERA.

1,343,888.      Specification of Letters Patent.      Patented June 15, 1920.

Original application filed December 11, 1915, Serial No. 66,371. Divided and this application filed April 16, 1919. Serial No. 290,486.

*To all whom it may concern:*

Be it known that I, JOSEPH BECKER, a citizen of the United States, residing at Washington, in the District of Columbia, have invented certain new and useful Improvements in Photographic Cameras, of which the following is a specification.

My present application, identified for convenience of reference in my related applications or patents as Case Be, is a division of my prior Case Ae, which is now Patent No. 1,301,897, granted Apr. 29, 1919.

My present invention relates to copying or enlarging cameras, and it consists in the separately patentable type of optical focuser disclosed in Figures 10 to 13 of my said Case Ae, and which is there designated as an optical focuser of the "single sight type."

The principle involved in my focusers of the "single sight type" is the same as that involved in reading time on a clock dial.

When the minute hand of a clock is set to indicate, for instance, nine minutes after the hour, the observer, holding his eye in alinement with the pivotal axis of the minute hand, sees the point of the minute hand in alinement with the 9-minute mark. If his eye is laterally displaced with reference to the nine-minute axial plane, his reading is incorrect.

Hence correct reading of the time depends upon the act of bringing into optical alinement three material points, to wit: (1) the pupil of the eye; (2) the end of the minute hand; and (3) the nine-minute mark on the dial; for when such optical alinement has been secured, the retinal image of the minute-hand end, and the retinal image of the minute mark, are superposed, and perfect registration or apparent coincidence is obtained within the observer's eye.

A material peep hole, invariably fixed on the produced imaginary pivotal axis of the minute-hand, would insure correct placing of the eye, for all angular positions of the minute-hand; but in most cases, owing to the closeness of the minute-hand end to the face of the dial, the eye is always placed sufficiently near to a correct position without any special eye-positioning means, which would, however, become indispensable if the circular path described by the minute-hand end were really located at a considerable distance from the dial.

My present invention, as stated above, involves the same principle, and it, therefore, consists in an optical focuser that comprises two structural points, which are relatively moved whenever the camera parts are relatively moved for focusing, and which are so connected with the camera parts, that they are always brought into apparent register or alinement whenever, and only when, the camera is in focus.

The "single sight" focuser seen in Fig. 10 of said Case Ae, is mainly demonstrative, and it is not a convenient practical form. Hence, although I shall hereinafter make my claim sufficiently generic to include focusers of the class seen in the said Case Ae Fig. 10, I am using for present purposes the preferable embodiment seen in Figs. 11 to 13 of said Case Ae.

In the accompanying drawings:

Fig. 1, is a vertical axial section of a copying or enlarging camera having a preferred form of my "single sight" optical focuser, in which the structural point S will register optically with the structural point V', as shown, whenever the camera is in focus on the vertical plane P'V'.

Fig. 2 is a similar view illustrating "adjustment number one," which is made by focusing on left infinity; that is to say, by making PF of Fig. 1 infinitely long, so that F'P' must be equal to zero.

Fig. 3 is a second similar view illustrating "adjustment number two," which is made on right hand infinity; that is to say, by making F'P' infinitely long, so that PF must be equal to zero.

Fig. 4 is a table of equations and dimensions.

The bed of the camera is any truly planed heavy beam 1250 which is adapted to serve as a slide rail for the three camera frames $O^{12}$, $L^{12}$, $I^{12}$, whose bases are grooved to admit the beam so as to establish a smooth sliding fit with its upper face and two side faces.

The lens frame $L^{12}$ is preferably fixed to the beam 1250 by a screw 1251, as shown, because the principles involved are more easily understood when the lens is stationary, but such principles are simply dependent upon the relative movements of the three frames with relation to each other, and not upon the movements of any one of the three frames with relation to any stationary base. Either one of the end frames $O^{12}$ or $I^{12}$ might, therefore, be fixed to bed 1250 in place of the lens frame, and the three frames $O^{12}$, $L^{12}$, $I^{12}$, might be left free to slide, if desired.

The top of the lens frame $L^{12}$ is grooved to form a smooth longitudinal slideway 1252 for the foot 1253 of a bracket 1254. A screw 1255 passing freely through a slot in foot 1253 serves to clamp the bracket 1254 in any desired longitudinal adjustment on the lens frame $L^{12}$.

A pin 1220 whose axis is represented by a dot D is mounted in the bracket 1254 to serve as a pivot for the radial cam sector 1218, which is substantially the same as the sector 618 of my Case Ae Figs. 5 to 10, except that the right hand arm is converted into an alidade or sighting arm 1216' with a peep sight at D and a bead sight at S. This sighting arm 1216' has a hole 1217' which is adapted to register with either one of two similar holes 1240, 1240' bored in the bracket 1254. These holes 1240, 1240' are so located that when the sector 1218 is set to make bore 1217' register with bore 1240, as in Fig. 2, the radial arm 1216 points to left infinity; and it may be temporarily locked in such position by inserting the bolt or pin 1241, as shown in Fig. 2. On the other hand, when the sector is set to make bore 1217' register with bore 1240', as in Fig. 3, the radial arm 1216' points to right infinity; and it may be temporarily locked in such position by inserting the same bolt or pin 1241, as shown in Fig. 3. In Fig. 1 the pin 1241 is shown as partly inserted through the back into hole 1240', where it may be kept when not needed.

The top of the object frame $O^{12}$ is grooved to form a smooth longitudinal slideway 1262 for the foot 1263 of a bracket 1264. A screw 1265 passing freely through a slot in foot 1263 serves to clamp the bracket 1264 in any desired longitudinal adjustment on the object frame $O^{12}$.

The bracket 1264 is provided with an inclined groove 1215 corresponding in every particular to the groove 1015 of the Case Ae Fig. 10, and having its imaginary terminal at A. Terminal A, which is alined with groove 1215 at the same level as D in bracket 1254, remains in fixed relation to its bracket 1264 and follows the bracket 1264 in all its adjustments and movements.

A pintle 1219, mounted for adjustment in groove 1215 and whose axis is represented by a dot V, may be clamped to bracket 1264 at any desired distance AV from A.

The image frame $I^{12}$ is any block adapted to support the removable focusing screen 1201' which corresponds to the similarly removable focusing screen 1201 of the object frame.

Any point V' of the image plane P' that is lower than the horizontal line AD, Fig. 1, may be selected as the imaginary pintle V' corresponding to the pintle V' of the mechanical focuser seen in the Case Ae Fig. 10. The vector V'A', with A' at the level of D, but in fixed relation to plane P', at distance $m'$ therefrom, constitutes the imaginary terminal A' of the image frame $I^{12}$. The exact position of A' is determined by the condition that the vector V'A' and groove 1215 or vector VA must be equally and oppositely inclined in accordance with the Case Ae equation 11 and as indicated in Fig. 4; and this makes V'A' invariable both as to inclination and length so that terminal A' moves with plane P' as if V'A' and the upper $m'$ in Fig. 1 together constituted a rigid bracket. In practice no attention is paid to terminal A', which is introduced for the sole purpose of illustrating the principles involved.

The adjustments to secure "3-and-all" point correspondence with any given lens 509 are substantially the same as those described above for the mechanical focuser of the Case Ae Fig. 10, but it will be well to redescribe them in detail.

*Adjustment No. 1.*—" The $m'$ equal $x'$ adjustment" is the one that must be made in the first place, because $m'$ is invariable, and we must first satisfy the equation 13 by making $x'$ equal to $m'$.

The image frame $I^{12}$ is set and temporarily clamped in focus on left infinity, as seen in Fig. 2, to bring P' into coincidence with F' and thus reduce the Newtonian space F'P' of the lens to zero value.

The sector 1218 is now set with its arm 1216 pointed to left infinity and its temporarily held in such position by insertion of the bolt 1241 as described above and as shown in Fig. 2.

Screw 1255 is then loosened, and with his eye at E, to sight along the radial arm 1216', the operator slides the bracket 1254 along on the lens frame $L^{12}$. This motion translates the sighting line DS horizontally, and causes the point where this sighting line meets the vertical image plane P' to move vertically. The operator, therefore, can always easily set the bracket 1254 so as to bring the sighting line DS onto any desired point of the image plane P', such as the point V' here selected, for convenience, in the upper edge of the plane.

When the operator has thus found the proper position of bracket 1254, which is that shown in Fig. 2, he firmly clamps the bracket 1254 to the lens frame $L^{12}$ by tightening screw 1255.

Terminal A' now evidently coincides with D and the Newtonian space DA' of the mechanism has been made equal to zero or equal to the present value of the Newtonian space F'P' of the lens. At the same time the imaginary bar $x'$ was varied in length to make it equal to the imaginary bar $m'$, or, in the present case, equal to 37 centimeters.

If the temporary clamp used to hold the image frame $I^{12}$ be removed, such frame may now be slid off to any distance toward the right. In moving to the right it carries its points $P'$ and $A'$ away from the stationary points $F'$ and $D$ through distances $F'P'$ and $DA'$ that are necessarily equal, and we, therefore, know that the right hand Newtonian space $DA'$ of the mechanism must henceforth be and remain equal to the right hand Newtonian space $F'P'$ of the lens, as required by equation $DA'=F'P'$. We can now proceed with adjustment No. 2.

*Adjustment No. 2.*—In making adjustment No. 1 the bar $x'$ was varied to make it equal to bar $m'$, and this operation necessarily varied bar $x$ to make it equal to $FF'$ minus $x'$. In the second adjustment, therefore, we are to satisfy equation 12 by varying bar $m$ to make it equal to $x$, or, in the present case, equal to 17 centimeters.

This is done as illustrated in Fig. 3. The object frame $O^{12}$ is set and temporarily clamped in focus on right infinity, as seen in Fig. 3, to bring $P$ into coincidence with $F$ and reduce the Newtonian space $PF$ of the lens to zero value.

The sector 1218 is now set with its arm 1216' pointed to right infinity, and it is temporarily held in such position by insertion of the bolt 1241.

Screw 1265 is then loosened, and the bracket 1264 is slid along on the object frame $O^{12}$, which meanwhile remains stationary, as it is temporarily clamped to base 1250.

The bracket 1264 can thus be shifted until its groove 1215 registers with slot 1217 in arm 1216, and when this registration has been insured, by the insertion of pintle 1219 or $V$ at any arbitrary distance $AV$ from $A$, the screw 1265 is firmly tightened to clamp bracket 1264 in its thus self determined adjustment on the object frame $O^{12}$. It should be noted that when the radial cam occupies its present position of Fig. 3 it is capable of registering with pintle $V$ in any subsequently selected position of $V$, so that the present adjustment is in no way influenced by the later or third adjustment, which determines the value of $AV$.

Terminal $A$ now evidently coincides with $D$ and the Newtonian space $AD$ of the mechanism has been made equal to zero, or equal to the present value of the Newtonian space $PF$ of the lens.

At the same time the imaginary bar $m$ was varied in length to make it equal to the imaginary bar $x$, or, in the present case, equal to 17 centimeters.

If the temporary clamp used to hold the object frame $O^{12}$ be removed, such frame may now be slid back to the left to any desired distance, and as it moves it carries its points $P$ and $A$, away from the stationary points $F$ and $D$, through distances $DA$ and $FP$ that are necessarily equal. We, therefore, know that the left Newtonian space $AD$ of the mechanism must henceforth be and remain equal to the left Newtonian space $PF$ of the lens as required by the Case Ae equation 5. We can now proceed with adjustment No. 3.

*Adjustment No. 3.*—The object of this adjustment is to locate $V$ in its groove 1215 so that the product $AV.A'V'$ shall be equal to the square of the focal length of the lens in acordance with the Case Ae equation 14.

This is done automatically as follows: The end frames $O^{12}$, $I^{12}$ are set and temporarily clamped in focus on each other, say in the position of Fig. 1, without paying any attention to the exact value of the copying factor; and when this has been done the Case Ae equations 11, 12, and 13 are all satisfied, and nothing more remains to be done except to satisfy the Case Ae equation 14 by proper adjustment of the distance $AV$, as $A'V'$ is invariable, and, therefore, predetermined.

Pintle $V$ is, therefore, loosened and slid along in its groove 1215, and as it moves, either to shorten or to lengthen the distance $AV$ in Fig. 1, the sector 1218 is turned on its pivot $D$ and the sighting line $DS$ is made to sweep over the point $V'$ in plane $P'$. Pin $V$ can, therefore, be set so as to make the sighting line $DS$ point directely at $V'$ and when this position of $V$ has been found pintle 1219 is firmly clamped to bracket 1264 at its thus self determined proper distance from terminal $A$.

The temporarary clamps used to hold the end frames $O^{12}$, $I^{12}$ in focus on each other may now be removed and the device is ready for use.

*Use of the Fig. 1 camera.*—A characteristic feature of the optical focuser, Fig. 1, is that it leaves the three camera frames $O^{12}$, $L^{12}$, $I^{12}$ independent, to be relatively displaced, as freely as if the focuser were absent.

As a rule, therefore, the image is out of focus, and this is indicated by the fact that the three points $D$, $S$, and $V'$ are generally out of alinement.

It is always easy, however, to secure sharp focus by displacing one or more of the frames so as to bring the three points $D$, $S$, and $V'$ into the focus indicating relation; that is to say, into alinement.

Thus where the lens frame $L^{12}$ is stationary, as in Fig. 1, the operator can secure alinement, and hence focus, by shifting either one of the two end frames without moving the other.

If he leaves the object frame $O^{12}$ stationary the line of sight DS remains fixed, and with his eye at E he can by means of rope and pulley, or some equivalent gear, shift the image frame $I^{12}$ along on bed 1250 until point V' falls into the sighting line DS.

If he prefers to leave the image frame $I^{12}$ stationary he must secure focus by moving the object frame $O^{12}$. Moving the object frame $O^{12}$ makes sector 1218 turn on its pivot D and causes the sighting line DS to sweep over the image field. He can, therefore, easily set the object frame $O^{12}$ so as to point the sighting line DS directly at V', wherever V' happens to be.

Point V' in Fig. 1, throughout all its movements, remains at a constant level or distance below the horizontal plane that contains the three axes A, D, A'. Let this distance be called $h$.

Then $h$ is evidently equal to A'V' multiplied by the sine of angle delta ($\Delta$); but in reality $h$ and delta ($\Delta$), being both invariable, predetermine A'V', for $$A'V' = h/\sin \Delta.$$

NOTE 1.—The present obtuse angle radial cam focuser may be made like the "two-sight" focuser seen in my Case Ae—Fig. 16, so that its sighting arms DS shall point rearwardly toward the eye, instead of toward the object. The structural sector angle of the focuser then becomes equal to the acute angle supplement of the obtuse basic angle delta ($\Delta$).

NOTE 2.—While the obtuse angle type of radial cam focuser is preferred, for present purposes, there are special uses of the invention in which a basic angle delta ($\Delta$) that is equal to a right angle, or even smaller than a right angle, may present practical advantages; hence I make but one claim that is limited to the obtuse angle type.

NOTE 3.—I, moreover, do not limit my invention to focusers of the radial cam type, for it is quite evident that, in any form or type of accurately designed "mechanical" focuser, the judicious severance of one mechanical connection is sufficient, as in my case Ae Fig. 10, to convert such "mechanical" focuser into a "single sight" optical focuser, which, as a rule, will focus more precisely than the wholly mechanical focuser, because it is relieved of all stresses and resultant strains.

NOTE 4.—My Case Ae explains that the stresses, just referred to, may be so large in an obtuse angle radial cam mechanical focuser, as to render the device inoperative. But any such inoperative obtuse angle radial cam mechanical focuser may be rendered operative by converting it into a "single sight optical" form, as explained in Note 3, above. Hence I am making, in the present Case Ae, my broadest claim to a copying or enlarging camera having a radial cam focuser whose basic angle delta ($\Delta$) is obtuse.

NOTE 5.—No attempt has been made to show a compact arrangement which is always easily obtained by mounting the focuser flat against any preferred one of the four sides of the camera, either top, bottom, right, or left, as proposed for my linkage focuser in my Case K, now Patent 1,103,342, issued July 14, 1914, page 7, lines 24 to 31. The right hand side of the camera is shown used in Fig. 16 of my said parent application, Case Ae, for a radial cam focuser of the "two-sight" type.

What I claim as my invention and desire to secure by Letters Patent is:

1. The combination, with a copying or enlarging camera comprising three relatively movable frames, to wit: (1) an object frame; (2) a lens frame; (3) and an image frame; also means for relatively guiding said three frames to permit of placing and holding them in any conjugate relation necessary to secure the sharpest image of any desired size; of an optical focuser for said camera, adapted to indicate, by single sight, at all times, and for all positions of the said three camera frames, the exact focal condition of the camera; said focuser comprising two relatively movable structural points; also connections between said two structural points and the said three camera frames, such that said two structural points shall be in apparent register or alinement whenever, and only when, the said camera is in focus.

2. A structure comprising the elements of claim 1; and, in addition thereto; a third structural focuser point which is adapted to locate the observer's eye in a position that avoids parallactic error in reading the relative position of the said first two structural, focus-indicating, focuser points.

3. A structure comprising the elements of claim 1; and, in addition thereto: normally rigid but dimensionally adjustable structural elements, each element composed of two parts that are adapted to be clamped in any relative position that sets a dimension of said element, at any conceivable value that may be required to suit the dimensions of any one of different lenses.

4. A copying or enlarging camera having a focuser which is of the radial cam type, and whose basic angle delta ($\Delta$) is larger than a right angle.

In testimony whereof, I have signed my name to this specification in the presence of Mrs. MARY E. COWELL as a witness.

JOSEPH BECKER.

Witness:
MARY E. COWELL.